May 8, 1951 D. D. STREID ET AL 2,552,231
LIQUID FUEL SUPPLY SYSTEM FOR THERMAL POWER PLANTS
Filed Jan. 3, 1947

Inventors:
Dale D. Streid,
Charles R. Garbett,
by Prowell S. Mack
Their Attorney.

Patented May 8, 1951

2,552,231

UNITED STATES PATENT OFFICE 2,552,231

LIQUID FUEL SUPPLY SYSTEM FOR THERMAL POWER PLANTS

Dale D. Streid, Oak Ridge, Tenn., and Charles R. Garbett, Los Gatos, Calif., assignors to General Electric Company, a corporation of New York Application January 3, 1947, Serial No. 720,084

12 Claims. (Cl. 158—36.4)

1

This invention relates to a fluid distribution system, particularly a liquid fuel supply system for a thermal powerplant, such as a gas turbine. It is especially useful in connection with aircraft gas turbine powerplants, where the problem of starting the powerplant on the ground and during flight is particularly difficult, and where reliable re-starting in flight is essential.

Recently it has become customary in gas turbine powerplants to supply liquid fuel to the combustion chambers or "combustors" by means of a positive displacement pump driven from the turbine-compressor rotor of the powerplant. With this arrangement, the flow and pressure of the liquid fuel supplied by the pump is a function of the rotational speed of the powerplant. During the starting cycle, the powerplant rotor is caused to turn by an external source of power, such as an electric starting motor, and the fuel flow rises from zero to a value corresponding to the "idling" or "no load" speed, at which time the ignition devices are energized to initiate combustion.

With the fuel nozzles heretofore used in gas turbine combustors, it has been found that ignition is greatly facilitated if an additional increment of fuel is applied to the nozzles during the ignition operation. Of course, this could be done by manual manipulation of the fuel controls, but such a method would be unreliable and inconvenient.

An object of the invention is to provide an improved liquid fuel supply system for a gas turbine powerplant adapted to facilitate ignition of the fuel in the combustors.

Another object is to provide an improved fuel system including a liquid accumulator for supplying an additional increment of liquid at the moment of ignition.

Still another object is to provide an improved liquid accumulator for a fluid fuel system designed so that the accumulator may be of a minimum size and weight while effectively providing the additional fuel required for ready ignition.

Figure 1:
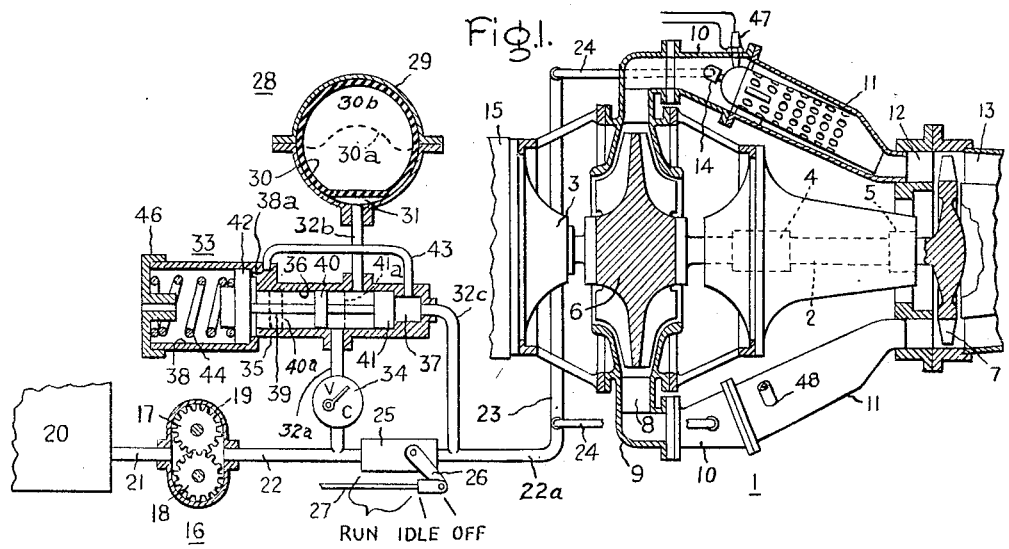
Figure 2:
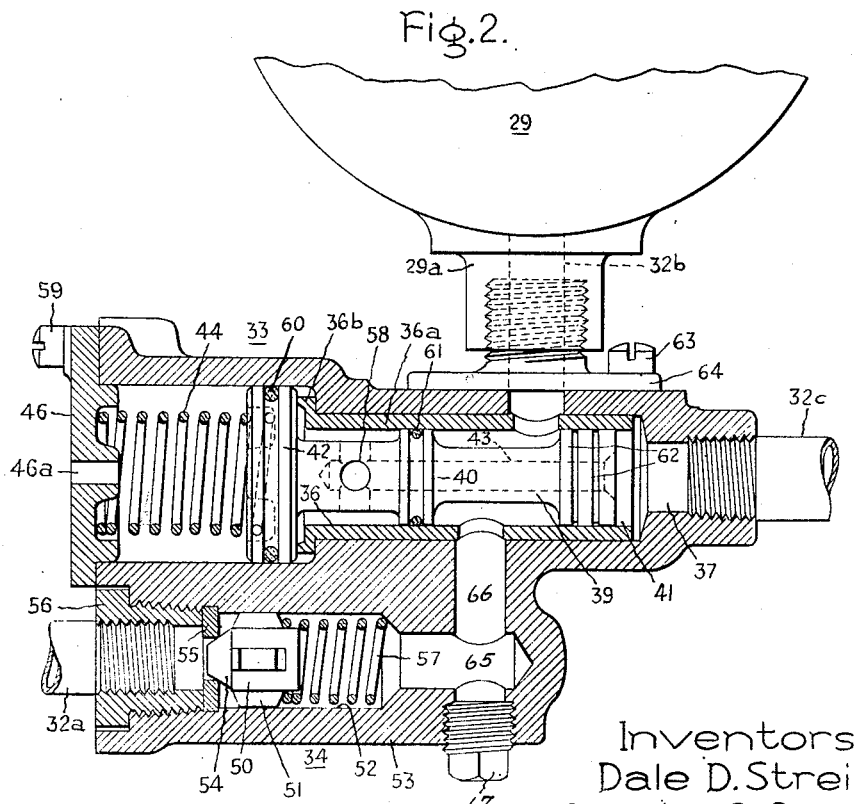

Other objects and advantages will be apparent from the following description taken in connection with the accompanying drawing in which Fig. 1 is a diagrammatic view of a known type of gas turbine powerplant having a liquid fuel supply system including an accumulator incorporating the invention, and Fig. 2 is an enlarged detail view of a special valve arrangement provided for use with the accumulator in accordance with the invention.

Referring now to Fig. 1, the gas turbine powerplant illustrated generally at 1 is of the type disclosed in United States Patent 2,432,359, issued December 9, 1947, on an application Serial No. 525,391, filed March 7, 1944, in the name of Dale D. Streid. This powerplant comprises a common

2 shaft 2 supported in suitable bearings 3, 4 and 5 and carrying a double entrance centrifugal compressor rotor 6 and a single stage axial flow turbine wheel 7. Air from the compressor 6 is discharged through a suitable diffuser 8 through elbows 9 and "air adapters" 10 to each of a plurality of combustors 11 circumferentially spaced around the axis of the powerplant with their discharge ends communicating with a nozzle ring 12 adapted to supply hot gas to the turbine wheel 7. Hot gases discharged from the turbine flow through an annular passage 13 to a discharge nozzle (not shown), which is preferably arranged as a jet propulsion nozzle when the powerplant is used in aircraft.

The combustors 11 are arranged in accordance with an application Serial No. 750,015, filed May 23, 1947, in the name of Anthony J. Nerad, and assigned to the same assignee as the present application, and are provided with suitable fuel nozzles 14. It will be readily appreciated by those skilled in the art that combustors and fuel spray nozzles of many other types may be employed in practicing the invention.

Secured to the front bearing housing 3 of the rotor shaft is a casing 15, which is a gear box driving a number of accessory devices mounted thereon for the powerplant, such as an electric starting motor (not shown) adapted to be connected to the shaft 2 so as to rotate it during the starting cycle of the powerplant. Also mounted on and driven by the casing 15 is a positive displacement fuel pump, illustrated diagrammatically at 16 as being of the well-known "gear type," although it may be of many other types. The pump shown includes intermeshing rotors 17 and 18 within a casing 19, the shaft of one of the rotors being connected by suitable gearing in casing 15 (not shown) so as to rotate at a fixed speed ratio relative to the powerplant rotor shaft 2. A specific arrangement for the fuel pump is more particularly described in the above-mentioned Streid application.

The pump 16 is adapted to draw a liquid fuel, for instance kerosene, fuel oil, or gasoline, from a reservoir 20 through a conduit 21, discharging it through a conduit 22. Conduit 22 leads to a valve 25 which is in turn connected by a conduit 22a to an annular manifold 23 having branch conduits 24 for supplying fuel to the respective nozzles 14.

The valve 25 is provided for controlling the supply of fuel to the powerplant. This valve has a control lever 26 adapted to be positioned through suitable linkage 27 which may be manually controlled by the operator through suitable linkage means (not shown). Various types of control valve may be used, such as one of the type disclosed in United States Patent 2,510,617, issued June 6, 1950, on an application Serial No.

682,554, filed July 10, 1946, in the name of Samuel R. Barr. This valve is preferably arranged so that it serves both as a "stopcock" for positively shutting off the supply of fuel to the powerplant, and serving also as a metering valve having an "idling" position and a range of "running" positions. When in the idling position, the valve permits the passage of just sufficient fuel to maintain operation of the plant under its own power in the "idling" or minimum speed condition. When the operating lever 26 is moved from "idling" into the "running" range, the fuel is metered according to a predetermined schedule of flow rates as a function of lever position, so as to effect operation of the powerplant at desired speeds and loads. It should be understood that many other types of fuel control valves may be used including valves actuated automatically by variously arranged control mechanisms.

In accordance with our invention, a hydraulic accumulator 28 is provided for delivering an additional increment of liquid to the fuel nozzle supply conduit during the starting cycle of the powerplant. This accumulator comprises a housing 29 containing a flexible diaphragm or bladder indicated at 30 in Fig. 1. The space 30b within the bladder is filled with air or other suitable gas under pressure. The bladder may be made of any suitable material such as a synthetic rubber and cooperates with the housing 29 to form a chamber 31 to which liquid is supplied through a conduit 32a, 32b containing a special valve assembly 33. Conduit 32a communicates with the fuel pump discharge conduit 22 at a point upstream from the control valve 25, and contains a suitable check valve 34 arranged to permit the flow of liquid to the accumulator, while preventing flow backwards into the conduit 22. Another conduit 32c connects the valve 33 with the conduit 22a at the downstream side of the control valve 25.

The internal arrangement of the valve assembly 33 is illustrated diagrammatically in Fig. 1. The housing 35 is provided with a longitudinal bore 36 communicating with a reduced bore portion 37 forming a discharge chamber at one end of the housing, and an enlarged bore 38 at the opposite end. Slidably arranged within the housing is a plunger member consisting of a rod 39 carrying axially spaced disks 40 and 41 arranged in the bore 36 and a third disk 42, of appreciably larger diameter than the disks 40, 41. Disk 42 constitutes a pressure-responsive piston arranged to slide in the bore 38. A suitable spring 44 engages the end cap 46 and the adjacent end face of the piston 42, so as to bias the plunger member to its extreme right-hand position, shown in Fig. 1.

The housing 35 is provided with suitable ports adapted to communicate with conduits 32a, 32b, and 32c, respectively. In the inactive condition, shown in Fig. 1, the plunger is in its extreme right-hand position with the disk 41 shutting off communication between the bore 36 and the bore portion 37, the latter being in communication with the discharge conduit 32c. The portion of bore 36 between the disks 40 and 41 is in communication with conduits 32a and 32b.

As indicated above, the disk 42 constitutes an actuating piston having on the side adjacent the bore portion 36 an effective area somewhat greater than the area of the disk 40. A bypass conduit 43 is arranged to communicate liquid pressure from the chamber 37 to the right-hand face of the piston 42, for a purpose which will appear hereinafter.

The operation of the system shown in Fig. 1 is as follows:

With the powerplant shut down and the fuel supply system in the inactive condition, as shown in Fig. 1, the plant will be started by causing the main rotor 2, 6, 7 to rotate by means of the auxiliary starting motor. As the speed of the rotor increases, the positive displacement fuel pump 16 turns faster, since it is geared to the rotor, and the discharge pressure in the supply conduit 22 rises accordingly. Since the control valve 25 is in the fully closed or "off" position, liquid pressure in conduit 22 effects flow through conduit 32a through the check valve 34 into the portion of the bore 36 between the valve disks 40, 41, and from there through conduit 32b to the space 31 in the accumulator 28. As the liquid pressure builds up in the space 31, the diaphragm 30 deflects upwardly as indicated by the dotted line 30a. This upward deflection of diaphragm 30 compresses the air contained in the accumulator above the diaphragm in space 30b. The accumulator is of course designed to have a capacity, in the fully charged condition, sufficient to deliver the extra fuel flow and pressure required during the ignition operation. It will be apparent that during this charging operation the discharge pressure of pump 16 is applied equally to the adjacent faces of disks 40 and 41 so that no net force is produced tending to move the plunger 39.

By the time the starting motor has brought the main rotor up to the speed required for ignition to take place, the compressor 6 will be rotating fast enough to supply combustion air to the combustors 11, and the accumulator 28 will be fully charged with fuel. When this condition is reached, the operator, or perhaps some automatic actuating mechanism moves valve 25 from the "off" to the "idle" position, in which position valve 25 meters fuel at a predetermined rate into the fuel nozzle manifold 23. As a result of this opening of valve 25, the discharge pressure produced in conduit 22 by the pump 16 drops appreciably, by reason of the release of the fuel pump discharge into the conduit 22a. The accumulator will not discharge backwards into the conduit 22 because of the presence of the check valve 34.

It should be observed that the opening of valve 25 has no immediate effect on the accumulator valve 33. However, when conduits 22a, 23, 24 and nozzles 14 are all charged with fuel, the pressure in conduit 22a begins to build up. The rate at which the fuel pressure rises will of course depend on the size of the fuel conduits, the capacity of the fuel pump, and the rate at which valve 25 passes fuel in the idling position. It will be seen that the pressure in the conduit 22a is communicated through conduit 32c to chamber 37, thence through bypass 43 to the portion of bore 36 between disk 40 and piston 42. Because piston 42 has a larger effective area than disk 40, a net force will be produced tending to move the plunger 39 to the left against the bias of spring 44. Eventually this force will become sufficient to move piston 42 from the annular seat 38a formed at the right-hand end of the bore 38. When this happens, the pressure communicated by bypass 43 will be applied to the full area of the right-hand face of piston 42 and the resultant increased force acting on the piston will cause plunger 39 to move quickly to the left, the projecting portion 42a of piston 42 engaging the stop 45 formed integral with the cap member 46. In this position, the valve disk 40 will occupy the dotted line position 40a, while disk 41 moves to the dotted line position 41a. Disk 41 now shuts off communication from conduit 32a to conduit 32b and opens communication from conduit 32b through the right-hand end portion of bore 36 to chamber 37 thence through conduit 32c to the conduit 22a. The air pressure above the diaphragm 39 now forces the liquid contained in the accumulator below the diaphragm through conduits 32b and 32c into the conduit 22a and the nozzle supply manifold 23. Thus the accumulator furnishes suddenly an additional increment of liquid fuel flow and pressure which enables the nozzles 14 to produce an effective spray of fuel into the combustors 11 for a time long enough to effect ignition. It should be particularly noted that this extra increment of fuel is not delivered until the nozzle supply conduits are completely filled with liquid. Thus the capacity, size, and weight of the accumulator may be a minimum, since the accumulator is not required to furnish the fluid necessary to fill the supply conduits, that being accomplished by the fuel pump before the accumulator discharges.

A spark plug may be located in one or more of the combustors 11, as shown at 47 in Fig. 1, and may either be arranged to be energized at the moment the accumulator 28 discharges, or the spark plug may be energized continuously during the starting cycle of the powerplant. In either event the spray produced by nozzles 14, as a result of the extra flow and pressure applied by the accumulator, is effective to produce the critical fuel-air mixture required for ignition. Combustion therefore is initiated, and flame from those combustors having spark plugs 47 is communicated by means of "cross-ignition tubes" 48 to the other combustors which do not have spark plugs. This arrangement is more specifically described in the above-mentioned application of Dale D. Streid. Once combustion begins, the flow and pressure supplied by fuel pump 16 as controlled by valve 25 in the idling position is sufficient to maintain stable combustion and to accelerate the main rotor from starting to idling speed.

To effect operation of the powerplant at a desired load, the actuating lever 26 of control valve 25 is moved into the "running" range, in which positions fuel is metered to the powerplant at rates varying as a predetermined schedule of the position of the lever 26. During such normal operation of the powerplant, fuel pump pressure is applied through conduit 32c and bypass 43 so as to act on piston 42 and hold the plunger in its left-hand position with spring 44 compressed. Disc 41 now occupies the dotted line position 41a, in which it blocks conduit 32a, so that no fuel can bypass valve 25.

When the powerplant is shut down by returning the control valve lever 26 to the "off" position, the pressure in the fuel manifold 23 and in conduit 22a rapidly falls, with the result that spring 44 causes the plunger 29 to return to the inactive condition, as shown in Fig. 1. The system is now ready for the accumulator 28 to be re-charged during the next starting cycle.

Fig. 2 shows one specific form which the accumulator control valve 33 may take. Here the various components carry reference numbers corresponding to those used in the schematic representation in Fig. 1. It will be observed that the check valve 34 consists of a cylindrical plunger 50 having three or more radially extending ribs 51, the ends of which are arranged to slidably engage a bore 52 formed in the check valve housing 53. The conical end 54 of the check valve plunger 50 is arranged to sealingly engage an orifice defined by a ring 55, the latter being secured against an annular shoulder in the housing by means of a threaded plug member 56. The member 56 may be conveniently provided with a threaded bore so as to serve also as the pipe fitting for connecting the conduit 32a, in a manner which will be readily apparent from Fig. 2. A suitable spring 57 is housed within the bore 52 and is arranged to bias the plunger 50 so that the conical end portion 54 engages the orifice plate 55.

In this construction, the plunger 39 is of sufficient diameter that the bypass passage 43 can be formed in it as a longitudinal passage drilled from the right-hand face of disk 41 and communicating with one or more transverse drilled passages 58 communicating with bore 36 at a location between disk 40 and piston 42. For aircraft service, the housing of the valve assembly 33 may preferably be cast in one piece from a light alloy of magnesium or aluminum, in which event a bushing 36a of bronze or other similar material with good wearing qualities may be provided, being pressed or otherwise secured in the housing. The end of bushing 36a is provided with a radially extending flange forming an annular seat 36b against which the piston 42 abuts. The effective area of the piston 42 contained within the diameter of the seat 36b is greater than the effective area of the adjacent face of disk 40, but is somewhat less than the aggregate area of the piston 42. This arrangement causes movement of the plunger with a "snap action" in the manner described above.

The cap member 46, which forms a closure for the end of bore 38, may be secured to the housing by suitable threaded fastenings 59, and is provided with a vent 46a through which ambient air passes in response to movement of piston 42. It will be obvious that by suitably restricting the vent 46a a retarding action may be provided for the piston 42 so as to cushion its sudden movement to the left when the accumulator discharges. The piston 42 may be provided with an annular groove in its outer surface accommodating a suitable resilient packing ring 60 to prevent leakage, and disk 40 may have a similar packing ring 61. The other disk 41 may be equipped also with a resilient packing ring, or may merely have one or more circumferential grooves 62 which constitute a satisfactory sealing arrangement, since a small amount of leakage here is not serious. The housing of the valve assembly 33 may be secured by fastenings 63 to a fitting 64 which engages a threaded bore in the boss 29a of the accumulator housing. Thus the control valve assembly forms a neat integral unit with the accumulator. The bore 52 in the check valve housing may be arranged to communicate with bore 36 through drilled passages 65 and 66, the latter having an exterior end closed by a suitable threaded plug 67 and an opposite end portion in registration with a port in bushing 36a. A second port in bushing 36a registers with the port in housing 35 associated with conduit 32b.

It has been found that fuel accumulators arranged in accordance with our invention are capable of effecting ready ignition in a gas turbine powerplant over a wide range of conditions. With an accumulator discharge valve assembly arranged as described above, the accumulator itself may be of a minimum capacity, which is of importance in aircraft gas turbine powerplants where size and weight are of the utmost concern to the designer. While the invention has been described as applied to a gas turbine powerplant using liquid fuel burned in air, it will of course be obvious to those skilled in the art that it may also be useful in connection with other liquid pressure systems, and for other types of thermal reaction systems using various other fluid reactants where it may be desired to obtain a sudden "burst" of fluid flow and pressure.

What we claim as new and desire to secure by Letters Patent of the United States, is:

1. In a fluid distribution system, the combination of a consumer, means for supplying fluid at variable pressure, first conduit means connecting said fluid supply means to the consumer, flow restricting means in the first conduit means, a fluid pressure accumulator, means including a second conduit connecting the fluid supply means and the accumulator and adapted to supply fluid thereto, third conduit means connected to the first conduit means at the downstream side of said flow restricting means, an automatic valve means connected to the accumulator and said third conduit and operative in response to fluid pressure supplied to the consumer only when said pressure reaches a preselected value, whereby the accumulator is caused to discharge through the third conduit means to the consumer.

2. In a fluid distribution system, the combination of a consumer having a starting cycle and a normal operating cycle, means for supplying liquid at a pressure which rises from zero during the starting cycle, conduit means connecting the discharge of the supply means to the consumer, flow restricting means in said conduit, a fluid pressure accumulator connected to said conduit between the supply means and said restricting means and adapted to discharge fluid to the consumer, and automatic valve means for controlling the charging and discharging of the accumulator, said valve means including pressure-responsive means adapted to direct fluid to the accumulator from the supply means when the pressure at the downstream side of said restricting means is below a preselected value and to discharge the accumulator to the consumer when said pressure rises to the preselected value.

3. In a fluid distribution system, the combination of a consumer, means for supplying fluid at variable pressure, first valve means for regulating the flow of fluid to the consumer, first conduit means connecting the supply means to said valve means, second conduit means connecting the valve means to the consumer, a fluid pressure accumulator, second automatic valve means having a fluid passage communicating with the accumulator, a charging conduit connected to the first conduit means and the automatic valve means, a discharging conduit connected to the second conduit means and to the automatic valve means, said automatic valve means including a flow-controlling member adapted to effect communication between the charging conduit and said fluid passage in a first position of said member and to interrupt that communication and cause the accumulator to be connected to the discharging conduit in a second position of said member, and means responsive to the pressure in the second conduit adapted to cause the flow-controlling member to move to said first position when said pressure is below a preselected value whereby the accumulator is caused to be charged, and said pressure responsive means also being adapted to cause said member to move to the second position when said pressure rises to said preselected value, whereby the accumulator is caused to discharge fluid to the second conduit through said fluid passage and the discharging conduit.

4. In a thermal powerplant, the combination of a fluid energy generator, means for supplying fluid reactant at variable pressure, conduit means connecting said reactant supply means to the generator, flow restricting means in said conduit, a fluid accumulator connected to said conduit means at the upstream side of the flow restricting means, and automatic valve means responsive to the fluid pressure in said conduit means at the downstream side of said restricting means for interrupting communication between said conduit means and the accumulator and establishing communication from said accumulator to said conduit means at the downstream side of said restricting means when said fluid pressure reaches a preselected value.

5. In a thermal powerplant, the combination of a fluid pressure energy generator, means for supplying fluid reactant at variable pressure, shut-off and metering valve means for controlling the flow of fluid reactant to the generator, first conduit means connecting said supply means to said metering valve, second conduit means connecting said metering valve to the generator, a fluid accumulator, automatic valve means having a fluid passage communicating with the accumulator, a charging conduit connected to the first conduit means and the automatic valve means, a discharging conduit connected to the second conduit means and to the automatic valve means, said automatic valve means including a member adapted to effect communication between the accumulator and the charging conduit in a first position and adapted to interrupt said communication and connect the accumulator to the discharging conduit in a second position, and means responsive to the pressure of the fluid supplied to the generator and operative to cause said member to assume the first position when said pressure is below a preselected value whereby the accumulator is caused to be charged, and to cause said member to assume said second position when said pressure rises to said preselected value, whereby the accumulator is caused to supply additional fluid to the generator to facilitate initiation of the reaction therein.

6. In a thermal powerplant, the combination of a fluid pressure energy generator, means for supplying a fluid reactant at variable pressure, first shut-off and metering valve means for controlling the flow of fluid reactant to the generator, first conduit means connecting said supply means to said metering valve means, second conduit means connecting said valve means to the generator, a fluid accumulator, automatic control means having a fluid passage connected to the accumulator, charging conduit means adapted to supply fluid from said supply means to the automatic control means, and discharging conduit means adapted to supply fluid from the automatic control means to the generator, said automatic control means including second valve means adapted to effect communication between the accumulator and said supply means in one position and adapted to connect the accumulator to the discharging conduit means in a second position, and means responsive to the pressure in the second conduit means and operative to cause the second valve means to assume said first position when said pressure is less than a preselected value and to cause said second valve means to assume the second position when said pressure rises to the preselected value.

7. In a thermal powerplant, the combination of a hot gas generator, a variable pressure fluid fuel pump, first conduit means for supplying fluid from the pump to the generator, shut-off and metering valve means in said conduit, a fuel accumulator, automatic valve means having a fluid passage communicating with the accumulator, charging conduit means adapted to supply fuel from the pump to the automatic valve means, and means adapted to supply fuel from said accumulator to the generator including a discharging conduit connecting the automatic valve means to the generator, said automatic valve means being operative in response to the pressure in the first conduit means at the downstream side of said metering valve means and adapted to establish communication between the accumulator and the pump when said pressure is below a predetermined value required for effective ignition and adapted to discharge the accumulator into the discharging conduit when said pressure rises to said predetermined value.

8. In a thermal powerplant, the combination of a hot gas generator, a variable pressure pump for supplying a fluid reactant to the generator, means for initiating a heat-releasing reaction in the generator, a first conduit connecting the discharge of the pump to the generator, a regulating valve in said conduit, a fluid accumulator for supplying additional reactant to the generator during the ignition process, means for supplying fluid to the accumulator, discharging conduit means connecting the accumulator to the generator, and pressure responsive valve means in said discharging conduit and adapted to discharge the accumulator into the discharging conduit only when the pressure in said first conduit downstream from the regulating valve rises to a preselected value.

9. In a thermal powerplant, the combination of a hot gas generator, means for initiating a reaction in the generator during the starting cycle, a variable pressure fluid reactant pump, conduit means containing a regulating valve and connecting the pump discharge with the generator, and means for supplying additional fluid reactant to the generator during the starting cycle including a fluid accumulator, automatic valve means connected to the accumulator, charging conduit means adapted to supply fluid from the pump to the automatic valve means, check valve means in the charging conduit means for preventing flow from the accumulator to the pump, discharging conduit means connecting the automatic valve means to the generator, said automatic valve means including a member adapted to establish communication between the charging conduit means and the accumulator in a first position and to interrupt said communication and establish communication between the accumulator and the discharging conduit means in a second position, and means responsive to the pressure of the fluid supplied to the generator and operative to cause said member to move to the first position when said pressure is below a preselected value whereby the accumulator is caused to be charged, and to cause said member to move to the second position when said pressure rises to said preselected value, whereby supplementary fluid is delivered to the generator for facilitating initiation of the reaction therein.

10. In a thermal powerplant, the combination of a combustor for burning liquid fuel, means for supplying liquid at a variable pressure, conduit means for supplying liquid from said supply means to the combustor, flow restricting means in said conduit means, a liquid accumulator, means including a second conduit connecting the liquid supply means and the accumulator and adapted to supply liquid thereto, third conduit means connected to the first conduit means at the downstream side of said restricting means, and automatic valve means connected to the accumulator and to said second and third conduits and including valve operating means responsive to the liquid pressure supplied to said first conduit means downstream from the flow restricting means for isolating said third conduit from the second conduit and the accumulator when said liquid pressure is less than a preselected value and communicating the third conduit with the accumulator when said liquid pressure reaches said preselected value.

11. In a fluid distribution system, the combination of a consumer, means for supplying fluid at variable pressure, first conduit means connecting said fluid supply means to the consumer, flow restricting means in the first conduit means, a fluid pressure accumulator, means including a second conduit connecting the fluid supply means and the accumulator and adapted to supply fluid thereto, third conduit means connected to the first conduit means at the downstream side of said flow restricting means, an automatic valve means connected to the accumulator and said third conduit and operative in response to fluid pressure supplied to said first conduit downstream of said accumulator only when said pressure reaches a preselected value, whereby the accumulator is caused to discharge through the third conduit means to the consumer.

12. A valve device comprising: a body having an inlet port, an outlet port, and an accumulator port; means communicating said inlet port with said accumulator port, valve means in said body having operating means therefor responsive to the pressure in said outlet port relative to the ambient pressure for isolating said outlet port from said accumulator port when the pressure in the outlet port is below a predetermined value relative to the ambient pressure and communicating the outlet port with the accumulator port when said pressure is above said predetermined value relative to the ambient pressure.

DALE D. STREID.
CHARLES R. GARBETT.

REFERENCES CITED

The following references are of record in the file of this patent:

UNITED STATES PATENTS

| Number | Name | Date |
|---|---|---|
| 2,005,832 | Vidalie | June 25, 1935 |
| 2,183,586 | Phillips | Dec. 19, 1939 |
| 2,353,269 | Roth | July 11, 1944 |
| 2,358,875 | Nichols | Sept. 26, 1944 |